United States Patent
Kasravi et al.

(10) Patent No.: US 9,286,112 B2
(45) Date of Patent: Mar. 15, 2016

(54) DETERMINING AND DISPATCHING PROCESSING AGENT FOR TRANSACTION PROCESSING

(75) Inventors: Kas Kasravi, Bloomfield, MI (US);
Robert J. Rappold, Henrico, VA (US);
Philip C. Jackson, Jr., Troy, MI (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 159 days.

(21) Appl. No.: 13/877,069

(22) PCT Filed: Oct. 12, 2010

(86) PCT No.: PCT/US2010/052230
§ 371 (c)(1),
(2), (4) Date: Mar. 29, 2013

(87) PCT Pub. No.: WO2012/050562
PCT Pub. Date: Apr. 19, 2012

(65) Prior Publication Data
US 2013/0219396 A1    Aug. 22, 2013

(51) Int. Cl.
G06F 9/46 (2006.01)
G06Q 40/00 (2012.01)
H04L 12/24 (2006.01)

(52) U.S. Cl.
CPC .............. *G06F 9/466* (2013.01); *G06Q 40/00* (2013.01); *H04L 41/046* (2013.01)

(58) Field of Classification Search
None
See application file for complete search history.

(56) References Cited

U.S. PATENT DOCUMENTS

| 5,793,861 A * | 8/1998 | Haigh ........................... 257/693 |
| 5,796,934 A * | 8/1998 | Bhanot et al. ................. 714/4.12 |
| 6,574,750 B1 * | 6/2003 | Felber et al. ..................... 714/20 |
| 7,562,009 B1 * | 7/2009 | Emerson ................. G06F 17/27 704/9 |
| 7,933,983 B2 * | 4/2011 | Steele et al. ................... 709/224 |
| 2002/0026423 A1 | 2/2002 | Maritzen et al. |
| 2003/0101113 A1 | 5/2003 | Dang et al. |
| 2004/0098358 A1 * | 5/2004 | Roediger ......................... 706/46 |
| 2004/0153748 A1 | 8/2004 | Fabrizi et al. |
| 2004/0205772 A1 * | 10/2004 | Uszok ..................... H04L 29/06 719/317 |

(Continued)

FOREIGN PATENT DOCUMENTS

| KR | 10-2002-0058173 A | 7/2002 |
| KR | 10-2006-0069775 A | 6/2006 |

OTHER PUBLICATIONS

International Search Report and Written Opinion for PCT Application No. PCT/US2010/052230, Korean Intellectual Property Office, Jul. 8, 2011.

(Continued)

*Primary Examiner* — Meng An
*Assistant Examiner* — James J Lee
(74) *Attorney, Agent, or Firm* — Hewlett Packard Enterprise Patent Department

(57) ABSTRACT

According to one example of the present invention, there is provided a transaction processing system. The transaction processing system comprises a transaction analyzer for determining characteristics of a received transaction, a processing agent selector for selecting, based on the determined characteristics, a processing agent for processing the received transaction, and a dispatcher for dispatching the received transaction and the selected processing agent to a processing resource to cause the transaction to be processed in accordance with the selected processing agent on at least one of the computing devices.

16 Claims, 4 Drawing Sheets

(56) References Cited

U.S. PATENT DOCUMENTS

| | | | |
|---|---|---|---|
| 2004/0215710 A1* | 10/2004 | Awe | G06F 9/4443 709/202 |
| 2005/0177792 A1 | 8/2005 | Awe et al. | |
| 2007/0112574 A1 | 5/2007 | Greene | |
| 2008/0288314 A1 | 11/2008 | Dombrowski et al. | |
| 2009/0150276 A1 | 6/2009 | Dickelman | |
| 2009/0171752 A1 | 7/2009 | Galvin et al. | |

OTHER PUBLICATIONS

Doug Kaye, "Web-Services Transaction", Loosely Coupled—The Missing Pieces of Web Service, Feb. 20, 2004, 8 pages, downloaded online on Sep. 18, 2015.

European Patent Office, Communication pursuant to Article 94(3) EPC, (Office Action), EP Application No. 10858489, dated May 11, 2014.

European Patent Office, Extended European Search Report, EP Application No. 10858489, dated Feb 13, 2014.

European Patent Office, Summons to attend oral proceedings pursuant to Rule 115(1) EPC, EP Application No. 10858489, dated Apr. 28, 2015.

Haque et al., "Distributed Real-Time Nested Transactions", Elsevier Science Inc. 655 Avenue of the Americas, New York, NY 10010, J. Systems Software, 1994, 11 pages.

Jin et al., "Utilizing Web Services in an Agent Based Transaction Model", Proceedings, Workshop on Web Services and Agent-based Engineering, at the AAMAS-2003 conference, Melbourne, Australia, 2003, 20 pages.

Lang et al., "Agent Based Transaction Support in Commercial Grids", Proceedings of the Joint International Conference on Autonomic and Autonomous Systems and International Conference on Networking and Services (ICAS/ICNS 2005), 2005, 6 pages.

Liu, "Business Environment Scanner for Senior Managers: Towards Active Executive Support with Intelligent Agents", <ieeexplore.ieee.org/xpl/freeabs_all.jsp?arnumber=648292 > Publication Date: Jan. 6-9, 1998; On pp. 18-27; vol. 5.

Ongtang et al., "Agent-based Infrastructure for Data and Transaction Management in Mobile Heterogeneous Environment", 2009 International Conference on Communications and Mobile Computing, IEEE Computer Society 2009, 5 pages.

Ongtang et al., "Agent-based Transaction Management for Mobile Multidatabase", The 3rd IEEE International Conference on Wireless and Mobile Computing, Networking, White Plains, NY, USA, 20071008, Jan. 1, 2007, 8 pages.

Penserini et al., "Agent-Based Transactions into Decentralised P2P (Preliminary Search Report)", AAMAS'02, Jul. 15-19, 2002, Bologna, Italy, 2 pages.

Subbu Allamaraju, "Nuts and Bolts of Transaction Processing", .subbu.org/articles/nuts-and-bolts-of-transaction-processing Downloaded online on Sep. 21, 2015, 16 pages.

Vogler, "Distributed Transaction Processing as a Reliability Concept for Mobile Agents", Distributed Computing Systems, 1997., downloaded online on Sep. 18, 2015, 6 pages.

Wang et al., "An Agent-based Model for Web Services Transaction Processing", Proceeding IEEE '05 Proceedings of the 2005 IEEE International Conference on e-Technology, e-Commerce and e-Service, pp. 186-189.

Wikipedia, "Distributed transaction processing", Sep. 23, 2009, en.wikipedia.org/wiki/Distributed_transaction_processing downloaded online on Sep. 18, 2015, 3 pages.

Wikipedia, "Extreme Transaction Processing", downloaded online on Sep. 18, 2015, 3 pages.

atomikos.com, "Atomikos ExtremeTransactions®", Atomikos Main Products Overviews, Atomikos TransactionsEssentials®—Open Source JTA/XA—(printable), downloaded online on Sep. 21, 2015, 6 pages.

EPO; Decision to Refuse; EP application 10858489.7; Mailed Nov. 24, 2015.

* cited by examiner

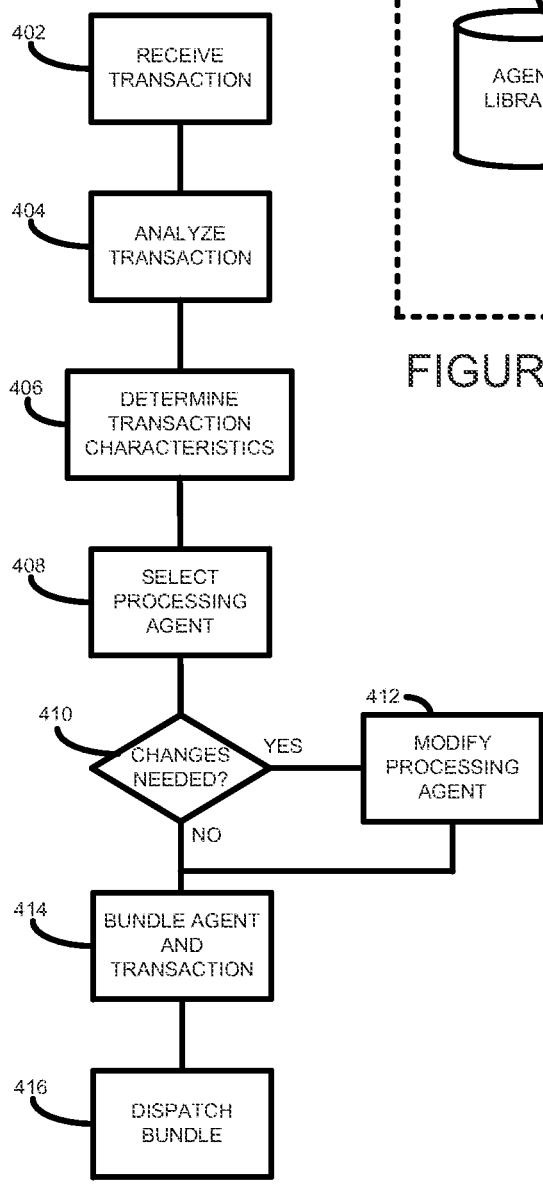
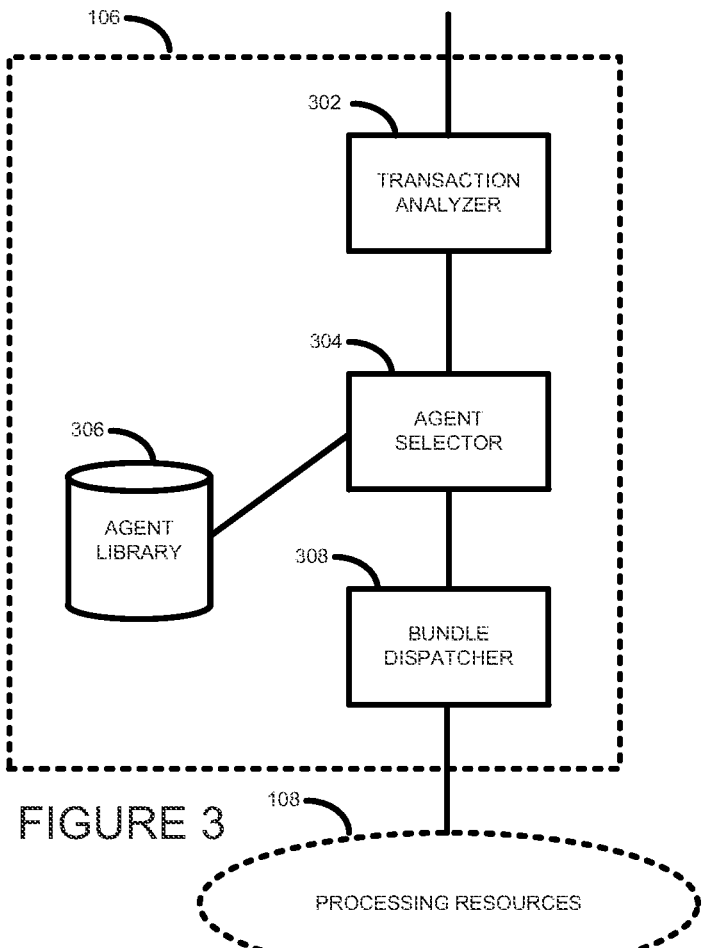
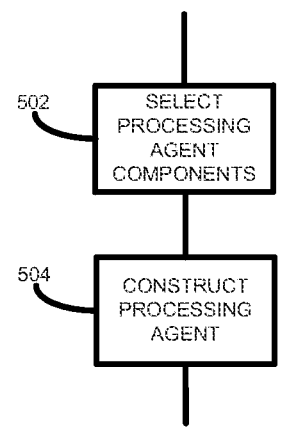
FIGURE 3
FIGURE 4
FIGURE 5

DETERMINING AND DISPATCHING PROCESSING AGENT FOR TRANSACTION PROCESSING

CLAIM FOR PRIORITY

The present application is a national stage filing under 35 U.S.C 371 of PCT application number PCT/US2010/052230, having an international filing date of Oct. 12, 2010, which is hereby incorporated by reference in its entirety.

BACKGROUND

The processing of electronic transactions is an important aspect of many of today's businesses and organizations. An electronic transaction may include, for example, a financial transaction, such as a money transfer or withdrawal, a billing transaction, a database transaction, a shopping transaction, and so on.

According to the well established ACID (atomicity, consistency, isolation, durability) notions, when an electronic transaction is processed it must either be successfully completed or it must be successfully cancelled.

In the past, electronic transactions were typically stored over a period of time and processed as a batch using batch processing techniques. Batch processing systems typically use dedicated computer hardware, such as mainframe computing systems, in a private or secure network for processing electronic transactions. In many cases businesses may have high volumes of electronic transactions that need processing each day, and typically batch processing is performed overnight for cost and resource reasons. Batch processing therefore introduces what may be a substantial delay between the electronic transaction being created and the electronic transaction being processed and are lacking somewhat in flexibility.

BRIEF DESCRIPTION

Examples and embodiments of the invention will now be described, by way of non-limiting example only, with reference to the accompanying drawings, in which:

FIG. 3 is a simplified block diagram illustrating a transaction manager according to an example of the present invention;

FIG. 4 is a simplified flow diagram outlining a method of operating a transaction manager according to an example of the present invention;

FIG. 5 is a simplified flow diagram outlining a method of operating a transaction manager according to an example of the present invention;

DETAILED DESCRIPTION

Figure 1:
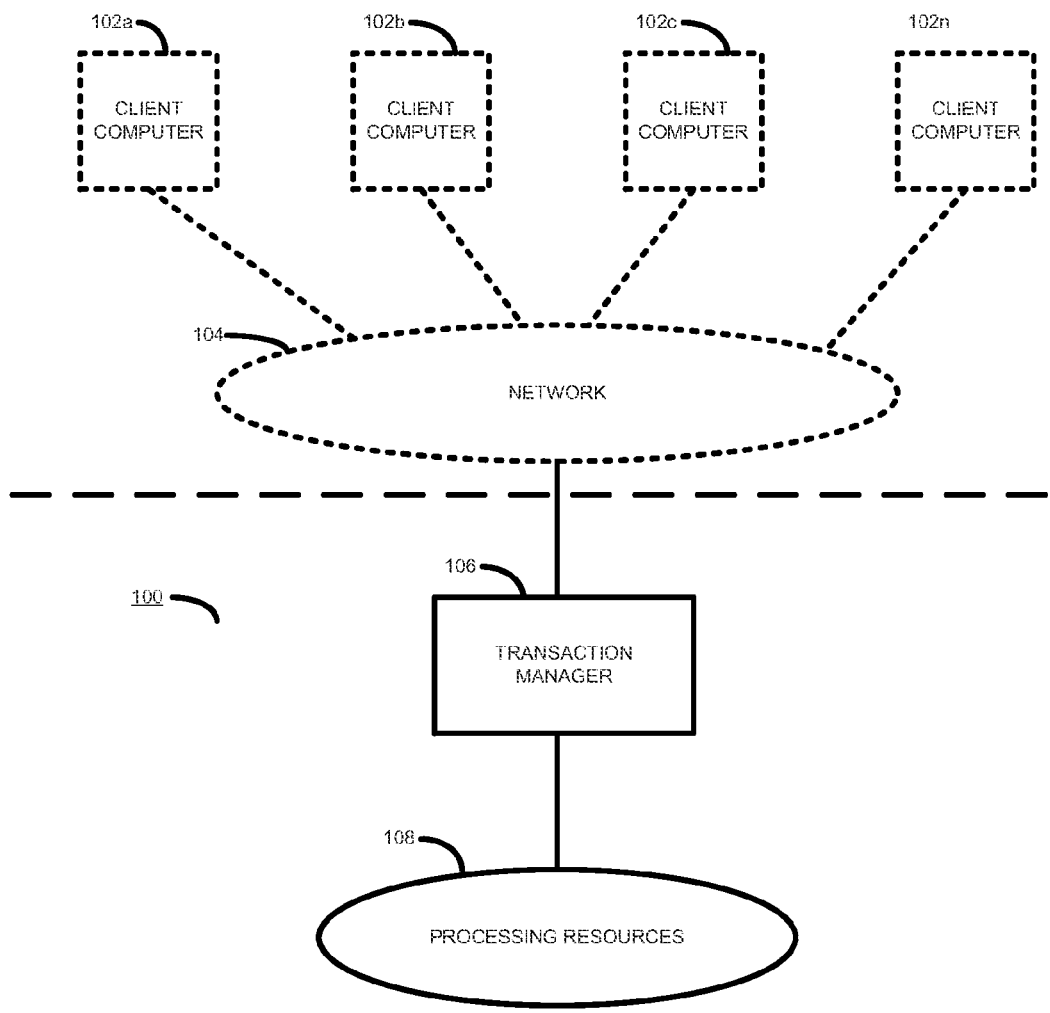
FIG. 1 is a simplified block diagram illustrating a transaction processing system according to an example of the present invention.
Figure 2:
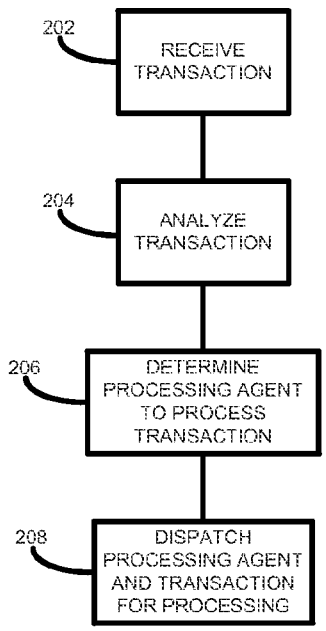
FIG. 2 is a simplified flow diagram outlining an example method of operating a transaction manager according to one example of the present invention.

Referring now to FIG. 1 there is shown a simplified block diagram illustrating a transaction processing system 100 according to one example of the present invention. Operation of the transaction processing system 100 is described below with further reference to the flow diagram of FIG. 2.

The transaction processing system 100 comprises a transaction manager 106 for receiving (202) electronic transactions via a network 104 and a set of processing resources 108. The electronic transactions may, for example, be sent by one or more client computing devices 102 via the network 104. The network 104 may be, for example, the Internet or any other suitable public or private network. The electronic transactions may be received by the transaction manager 106 in any appropriate manner such as, for example, in unencrypted or encrypted form, directly through the network 104, through a virtual private network (VPN), and so on.

Each of the client computers 102 may send one or more different types of transaction for processing by the transaction processing system 100. For instance, in one example client computer 102a may send billing transactions to be processed by the transaction processing system 100, whereas client computer 102b may send banking transactions and electronic commerce transactions to be processed by the transaction processing system 100. In some examples electronic transactions may comprise a plurality of transaction types, such as an electronic commerce transaction that comprises a payment transaction type and an order processing transaction type. Each transaction may require one or more processing operations to be performed in order for the transaction to be successfully processed.

In some examples, each type of transaction sent by one of the client computers 102 may require processing in a different manner to other transactions of the same type sent by a different one of the client computers 102.

The transaction manager 106 analyzes (204) each received electronic transaction and determines (206) a processing agent to be used to process the electronic transaction. The term processing agent as used herein is intended to include any suitable software application, software agent, intelligent software agent, computer program, applet, object, or the like written in any compiled, compilable, interpreted, interpretable, or parsable language that describes or defines a set of processing operations to be performed by a computing device.

The determination of which processing agent is to be used to process a given transaction may be achieved in a variety of different ways. In one example, an appropriate processing agent may be selected from a library of predetermined processing agents. In another example, an appropriate processing agent may be constructed from a library of predetermined processing agent and/or processing agent components. In a further example, a selected or constructed processing agent may be modified to perform the processing required by the electronic transaction. In a yet further example, a previously constructed processing agent may be selected.

Once an appropriate processing agent has been determined the transaction manager 106 dispatches (208) the electronic transaction and the determined processing agent to a processing resource or processing engine of the set of processing resources 108. The processing resource receiving the processing agent executes the processing agent which results in processing operations defined by the processing agent being performed on the electronic transaction.

In one example, the transaction manager 106 determines which processing resource in the set of processing resources 108 the transaction and associated processing agent are to be sent. In an alternative example, the transaction manager 106 may send the transaction and associated processing agent to a load-balancing element (not shown) for onward transmission to one or more of the processing resources in the set of processing resources 108.

The selection of the processing resource to which a transaction and associated processing agent are to be sent may be made using various criteria or characteristics of the processing resource. Example criteria may include processing resource processing load, processing resource work queue size, the suitability of a processing resource for performing a processing task, and so on. The processing resource criteria and characteristics may be obtained in any suitable manner including, for example, polling, interrogation, reporting, and through manual means.

In one example the processing resources 108 are dedicated computer devices, such as computer servers, which are dedicated or substantially dedicated to the processing of transactions.

In a further example at least some of the processing resources 108 are not dedicated processing resource. For example, if the transaction processing system 100 is provided by an enterprise having a number of employees who use computing devices, such as personal computers, laptops, etc., at least some of the processing resources 108 may be employee computing devices such as laptop and desktop computers. In many enterprise environments it is likely that at any one time a portion of the employee computing devices are operating with only light processing loads. This is likely to be the case, for example, for employees in primarily administrative roles. In enterprises with many thousands of employees, the amount of underutilized processing resources across the whole employee base may be substantial.

The transaction manager 106 will be now be described in greater detail in accordance with an example of the present invention, with further reference to FIGS. 3 and 4.

The transaction manager 106 comprises a transaction analyzer 302 for receiving (402) electronic transactions.

A received electronic transaction may take any appropriate form, such as a data structure, mark-up language description, or the like. An example of a simplified electronic bank transfer transaction described in an XML-type format is shown below.

---

EXAMPLE 1 - MONEY TRANSFER TRANSACTION

---

```
<?xml version="1.0" encoding="UTF-8"?>
<TRANSACTION TYPE>BANK MONEY
TRANSFER</TRANSACTION TYPE>
<TRANSACTION IDENTIFIER>1234.5678</TRANSACTION
IDENTIFIER>
<PROCESSING SECURITY>Required</PROCESSING SECURITY>
<DEBITING ACCOUNT>
    <ACCOUNT NUMBER>0123456</ACCOUNT NUMBER>
    <ACCOUNT HOLDER>Mr. A</ ACCOUNT HOLDER>
    <BANK IDENTITY>01234</DEBITING BANK IDENTITY>
</DEBITING DATA>
<CREDITING ACCOUNT>
    <ACCOUNT NUMBER>6543210</ ACCOUNT NUMBER>
    <ACCOUNT HOLDER>Mr. B</ ACCOUNT HOLDER>
    <BANK IDENTITY>65432</ BANK IDENTITY>
</CREDITING DATA>
<TRANSFER AMOUNT>$1000</TRANSFER AMOUNT>
```

The transaction analyzer 302 analyzes (404) the received electronic transaction and determines (406) characteristics of the transactions. The characteristics may include, for example, the transaction type and the nature of the processing that is required to be performed thereon. The nature of the processing required to be performed may depend on the nature of the electronic transaction received. As previously mentioned, an electronic transaction may comprise one or more transaction types and may require one or more processing operations to be performed thereon.

In the present example, where the electronic transaction is received in an XML-type format, the transaction analyzer 302 determines (404, 406) the type or types of the received electronic transaction by parsing the XML tag or tags <TRANSACTION TYPE> present in the electronic transaction. In the present example a single XML tag <TRANSACTION TYPE> defines the transaction type as being a 'bank money transfer' type transaction.

In an alternative embodiment, the transaction analyzer 302 determines (404, 406) the type or types of transaction by analyzing the different elements of the electronic transaction. For example, in the present example the transaction analyzer 302 may determine that the received electronic transaction is a 'bank money transfer' type transaction by analyzing the different elements of the electronic transaction. For example, using suitable parsing techniques the transaction analyzer 302 may determine that the electronic transaction comprises details of a 'debiting account', a 'crediting account', and a 'transfer amount'. From these details the transaction analyzer may determine, for example using artificial intelligence, decision trees, inference, analytics; searching or lookup techniques, pattern matching, etc. that the received electronic transaction is a 'bank money transfer' type.

Based on the determined type or types of transaction an agent selector module 304 selects (408) a processing agent to process the received electronic transaction from a processing agent library 306. The processing agent library 306 may be, for example, stored in a local database, accessible over a network, accessible over the Internet, or in any other appropriate manner.

In the present example the processing agent library 306 comprises predetermined processing agents suitable for processing different types of electronic transactions. For example, a first processing agent may be suitable for processing domestic bank transfers, a second processing agent may be suitable for processing international bank transfers, and so on. In a further example each processing agent may include metadata, searchable text, identifiers, or the like that enable the nature of the processing operations performable by a processing agent to be determined. For example, a JAVA processing agent may include one or more comments or other identifiers that enable the processing operations of the processing agent to be determined.

In a further example the processing agent library 306 may comprise different processing agents depending on the target environment in which the processing agents are to be executed. For example, the processing agent library 306 may include, for example, a Windows and Linux version of each processing agent, a single threaded and multi-threaded version of each processing agent, and so on.

The agent selector 304 may search the agent library, using suitably extracted data from the received electronic transaction, to determine an appropriate processing agent to be used to process the received electronic transaction. In one example, the agent selector may determine a number of possible appropriate processing agents and may determine a relevancy rating for each processing agent. The relevancy rating may, for example, be determined by determining whether there is an exact or close match of every field in the received electronic transaction and the processing agent, or by determining whether the processing operations required by an electronic transaction are included in a processing agent.

An example selection of appropriate agents is shown below in Table 1.

TABLE 1

Example selection of appropriate agents

| TRANSACTION TYPE | PROCESSING AGENT IDENTIFIER | RELEVANCE |
| --- | --- | --- |
| Bank money transfer | DomesticBankTransfer001 | 100% |
| Bank money transfer | InternationalBankTransfer001 | 95% |
| Intra-bank money transfer | IntraBankMoneyTransfer001 | 80% |
| Ecommerce Transaction | ECommerceTransaction | 10% |

The agent selector 304 then selects (408) the most appropriate processing agent.

In a further example, as outlined in FIG. 5, the agent library 306 additionally includes predetermined processing agents components suitable for processing or part-processing different types of electronic transactions. For example, a first processing agent component may be suitable for processing domestic bank transfers, a second processing agent component may be suitable for processing international bank transfers, and so on.

In this further example, as illustrated in FIG. 5, the agent selector 304 may search the agent library, using suitably extracted data from the received electronic transfer, to select or determine (502) one or more appropriate processing agents and/or processing agent components that may be combined together to construct (504) a processing agent suitable for processing the received electronic transaction. The agent selector 304 may determine a number of possible appropriate processing agents and/or processing agent components and may determine a relevancy rating for each.

The construction of a processing agent by combining one or more processing agents or processing agent components may be achieved in any suitable manner. A constructed processing agent may be stored back in the agent library 306 allowing it to be re-used, if appropriate, at a later time. Enabling reuse of constructed processing agent helps enables further transactions of the same type to be processed with increased efficiency.

At 410 the agent selector 304 determines whether any modifications are needed to the selected processing agent. Such a determination may be made, for instance, if the relevance rating of the selected processing agent is less than 100% or some other predetermined level.

In one example modification of the selected processing agent may be performed automatically by the agent selector 304. For example, the agent selector 304 may access a database or knowledge base (not shown) of multiple agent component selection patterns.

In a further example, modification of the selected processing agent may be performed manually, for example, by a suitable system administrator. The step 412 may therefore include, for example, notifying a human expert that a processing agent requires modification. A modified processing agent may be stored back in the agent library 306 allowing it to be re-used, if appropriate, at a later time.

In at least one example, the processing agents are such that, upon execution, the processing of an electronic transaction will either be completed successfully without error or the state of any systems affected by the processing will be rolled-back or restored to their initial states prior to the processing being attempted. If the electronic transaction is processed successfully the transaction is committed, and any changes made to the systems affected by the processing are made permanent.

The selected processing agent is then bundled, combined, or associated (414) with the received electronic transaction in an appropriate bundle, package, object, or the like. In one example, bundling may include generating a new package or object encapsulating both the selected processing agent and the received electronic transaction.

In another example, the electronic transaction may be incorporated into the processing agent. For example, if the determined processing agent is a JAVA applet, the received electronic transaction may be incorporated into the code of the JAVA applet, for example, by way of a data structure.

The agent selector 304 then passes the created bundle to a bundle dispatcher module 308. The bundle dispatcher 308 dispatches (416) the bundle to one of the set of available processing resources 108. As previously mentioned, the bundle dispatcher 308 may dispatch a bundle to a load-balancing module (not shown) or may perform load-balancing itself. In one example, the bundle dispatcher 308 obtains characteristics from individual processing resources of the set of processing resources 108 and dispatches bundles based on those characteristics. For example, the bundle dispatcher 308 may obtain processing resource characteristics including processor load, free memory capacity, processor type, processor speed, etc.

Figure 7:
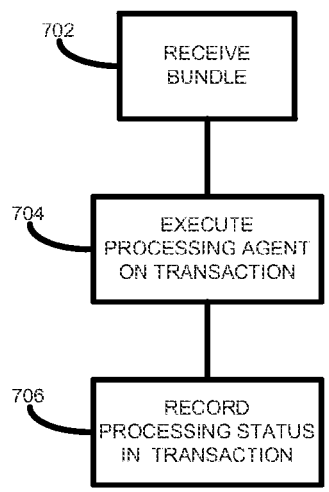
FIG. 7 is a simplified flow diagram outlining a method of operating a processing resource according to an example of the present invention.

As shown in FIG. 7, the bundle is received (702) by a processing resource and the processing resource executes (704) the processing agent included in the bundle on the electronic transaction also included in the bundle. The execution of the processing agent causes the electronic transaction to be appropriately processed. Depending on the nature of the processing agent and the electronic transaction the processing of electronic transaction may be performed in different ways. For example, the execution of the processing agent may be performed uniquely on the processing resource to which the bundle was sent, may be passed to another processing resource, may solicit the use of other processing resources, may use or access external resources, and so on.

For example, the processing of a banking transaction may require the processing resource to execute a processing agent to interact with an external crediting bank computing system and a debiting bank computing system. Similarly, the processing of a check clearing transaction may require the processing resource to interact with a clearing authority computing system. The processing of a transaction may also require compliance with one or more policies available to the processing resource executing the processing agent via, for example, a remote policy store. Policies may include, for example, accounting regulations, government, or federal laws, and so on.

As previously mentioned, transaction processing requires that a transaction must either be successfully completed or it must be successfully cancelled.

Figure 6:
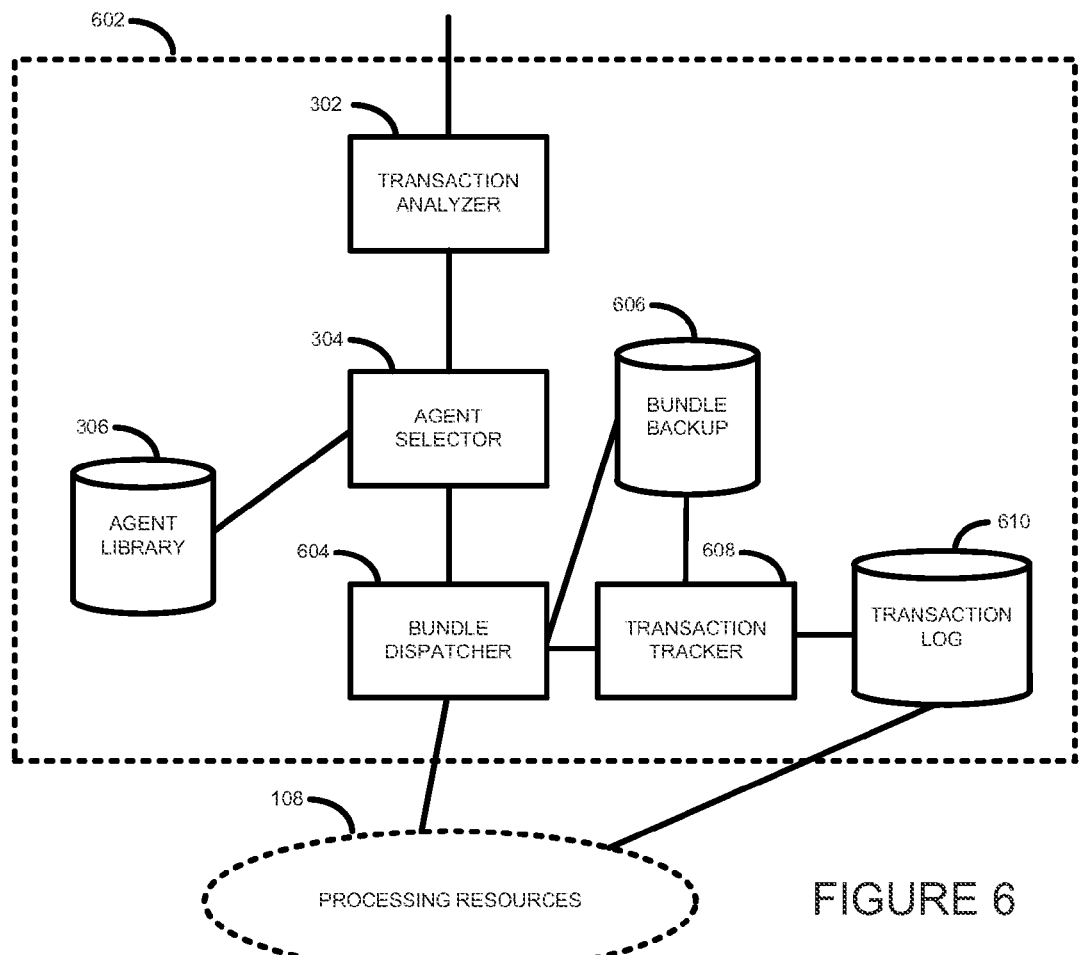
FIG. 6 is a simplified block diagram illustrating a transaction manager according to an example of the present invention.
Figure 8:
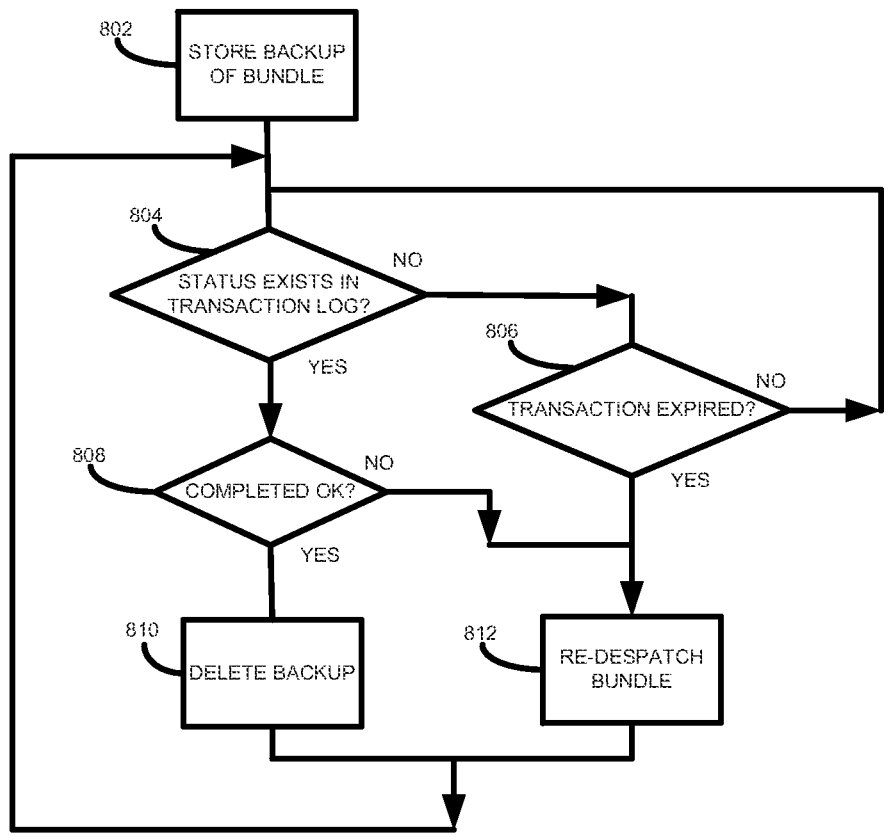
FIG. 8 is a simplified flow diagram outlining a method of operating a transaction tracker according to an example of the present invention.

In order to enable the completion status of each processed electronic transaction to be determined, a further example of a transaction manager 602 is shown in FIG. 6. The transaction manager 602 shares some common features with the previously described transaction manager 106. Operation of the transaction manager 602 will now be further described with reference to FIG. 8.

Each electronic transaction includes, or has added to it by the transaction analyzer 302, a transaction expiry time. The transaction expiry time is used to prevent a processing resource from processing a transaction once the transaction expiry time has passed.

The transaction manager 602 includes a bundle dispatcher 604 that stores (802) a back-up copy of each bundle dispatched by the bundle dispatcher 604, along with a timestamp indicating when the bundle was dispatched. In other examples additional data may also be stored, for example such as an identifier of the processing resource to which the bundle was dispatched may also be stored. The back-up resource is stored in a bundle backup data store 606. A transaction log store 610 is also provided. Although in the present example the transaction log store 610 is shown as being integral to the transaction manager 602, in other examples the transaction log store 610 may be external to the transaction manager 602 and accessible thereby.

Whenever a processing resource completes processing of an electronic transaction it records (706) the status of the result of the transaction processing in the transaction log 610. In the present example the recorded status may be either "Completed" or "Failed". In other embodiments additional details may be recorded in the transaction log including, time of completion, error messages (in case of failure), the identifier of the processing resource used, and so on.

The transaction log 610 may be accessible to the client computers 102, thereby enabling the client computers to determine when and if a transaction was processed. In one example, execution of the processing agent by a processing resource may also cause the processing resource to notify the originator of the electronic transaction that the transaction has been processed and the status of the processing.

A transaction tracker 608 in the transaction manager 602 periodically checks (804), for each bundle stored in the bundle backup data store 606, whether a completion status is available for the corresponding dispatched bundle in the transaction log 610. This may be performed, for example, before, at, or after the expiry of the transaction expiry time.

If a completion status does exist (804), the transaction tracker 608 determines (808) whether the transaction completed successfully. If the transaction tracker 608 determines that the transaction did complete successfully the transaction tracker 608 removes (810) the stored bundle from the bundle backup data store 606.

If the transaction tracker 608 determines (804) that no status exists for a particular transaction in the transaction log 610 the transaction tracker 608 further determines (806) whether the transaction expiry time has passed. The transaction expiry time period may differ for different types of transactions. For example, some types of transactions may be expected to complete in a relatively short length of time, whereas other types of transactions may be expected to take longer to complete. If the transaction expiry time has not passed this indicates that the transaction may not have had the time to be processed yet.

If the transaction tracker 608 determines (806) that the transaction expiry time has passed the transaction tracker 608 may request the bundle dispatcher 604 to re-dispatch the bundle. In this case, the bundle dispatcher 604 may update the details in the bundle backup data store 606 to indicate the new timestamp of when the bundle was dispatched. The bundle dispatcher 604 may also choose to send the bundle to a different one of the set of processing resources 108 should the processing of a transaction fail or not be completed. This helps avoid the duplicated processing of a transaction and a re-dispatched counterpart.

In one example the set of processing resources 108 are accessible over a secure network. This may be the case, for example, for financial and banking types of transactions. In other examples, however, security may not be an issue and the processing resources 108 may be any suitable processing resources available via a public or private network.

One advantage provided by the above examples is that electronic transactions may be processed in real or in substantially real-time. Therefore, whenever a client has an electronic transaction for processing it may send the transaction to a transaction manager, such as the transaction manager 106 or 602, for the transaction to be processed with little or no delay. Furthermore, the transaction manager may be provided remotely, by a third party, for example using a cloud computing infrastructure. In this way, transactions may be sent for processing from any network connected location, without the constraints of traditional batch processing-based transaction processors.

Furthermore, when a transaction manager, such as the transaction manger 106 or 602, receives an electronic transaction for processing it can determine the type of processing agent needed to process the transaction, can select or can generate the processing agent, and can dispatch the transaction and processing agent to a suitable processing resource. Further, if existing idle or little utilized computing resources are used to execute processing agents, the provider of the transaction manger 106 may be able to reduce the amount of dedicated transaction processing resources required to perform an electronic transaction processing system. Further still, transactions may be dispatched and processed at a controlled rate to ensure that processing resources are suitably managed and are not overloaded.

Furthermore, the distributed nature in which the transactions are processed helps increase security since it significantly reduces the risk of hacking. For instance, in at least some examples transactions may be sent to any one of a set of available processing resources, making it difficult for a third party to determine exactly where the transaction will be processed, and thereby reducing the risk that the processing of a transaction may be compromised.

Figure 9:
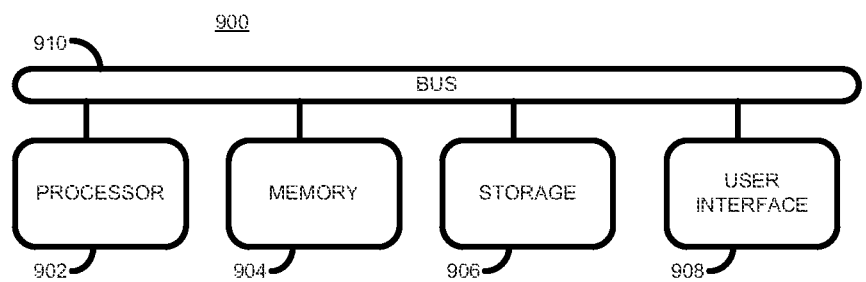
FIG. 9 is a simplified block diagram showing an example processing system on which a transaction manager according to an example of the present invention may be implemented.

Turning now to FIG. 9 there is shown a block diagram of computer system 900 on which the transaction manager 106 and 602, and processing resources 102, may be implemented in one example. For example, the transaction manager 106 and 602 may be implemented by way of programming instructions stored on a non-transitory computer readable storage medium 904 or 906. The memory 904 and storage 906 are coupled to a processor 902, such as a microprocessor, through a communication bus 410. The instructions, when executed by the processor 902 provide the functionality of a transaction manager as described above by executing the above-described method steps.

It will be appreciated that examples of the present invention can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are examples of machine-readable storage that are suitable for storing a program or programs that, when executed, implement examples of the present invention. Accordingly, examples provide a program comprising code for implementing a system or method as claimed in any claim and a machine readable storage storing such a program. Still further, examples of the present invention may be conveyed electronically via any medium such as a communication signal carried over a wired or wireless connection and examples suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. A transaction processing system comprising:
   a hardware processor;
   a data storage device storing machine readable instructions for a transaction analyzer, a processing agent selector, and a dispatcher, that are executable by the hardware processor, wherein
   the machine readable instructions for the transaction analyzer are executable by the hardware processor to determine characteristics of a transaction, wherein the characteristics comprises at least one transaction type and processing operation;
   the machine readable instructions for the processing agent selector are executable by the hardware processor to:
      determine, based on the characteristics of the transaction, processing agents, wherein at least one of the processing agents is constructed by selecting and combining processing agent elements from a library of predetermined processing agent elements;
      determine, based on the characteristics, a relevancy rating for each of the processing agents;
      select a processing agent with a highest relevancy rating;
      modify the selected processing agent if the relevancy rating of the selected processing agent is less than a predetermined level; and
      combine the selected processing agent and the transaction; and
   the machine readable instructions for the dispatcher are executable by the hardware processor to dispatch the combined processing agent and transaction to a processing resource of a set of processing resources to cause the processing agent to process the transaction on at least one computing device of the processing resource, wherein the processing agent comprises machine readable instructions.

2. The transaction processing system of claim 1, wherein the processing agent selector is further to store a created or modified processing agent in the library of predetermined processing agents.

3. The transaction processing system of claim 1, wherein the data storage device is to store a copy of each dispatched transaction and a transaction log for obtaining a processing status of each dispatched transaction; and a transaction tracker is to dispatch a copied transaction when it is determined that a corresponding dispatched transaction has not completed within a predetermined time period.

4. The transaction processing system of claim 3, wherein the transaction tracker is further to dispatch a copied transaction to a different processing resource.

5. The transaction processing system of claim 4, wherein the transaction tracker is further to delete from the data store the copy of a dispatched transaction for which it is determined that the corresponding dispatched transaction has completed successfully.

6. The transaction processing system of claim 1 wherein the processing resource is determined to have a processing resource characteristic below a predetermined threshold level and is selected based on the determination.

7. The transaction processing system of claim 1, wherein transactions are received from a set of client computing devices, and wherein a set of processing resources for the transactions are on a secure network.

8. The transaction processing system of claim 1, wherein the selected processing agent comprises machine readable instructions that describe or define a set of processing operations.

9. The transaction processing system of claim 8, wherein to dispatch the combined processing agent and transaction to the processing resource comprises sending the combined processing agent and transaction via a network to the processing resource.

10. A method of processing a transaction using a set of processing resources, comprising:
    receiving a transaction to be processed;
    determining characteristics of the transaction, wherein the characteristics comprises at least one transaction type and processing operation;
    determining, based on the characteristics of the transaction, processing agents, wherein at least one of the processing agents is constructed by selecting and combining processing agent elements from a library of predetermined processing agent elements;
    determining, based on the characteristics, a relevancy rating for each of the processing agents;
    selecting a processing agent with a highest relevancy rating;
    modifying the selected processing agent if the relevancy rating of the selected processing agent is less than a predetermined level;
    combining the selected processing agent and the transaction; and
    sending the combined processing agent and transaction to a processing resource of a set of processing resources to cause the processing agent to process the transaction on at least one computing device of the processing resource, wherein the processing agent comprises machine readable instructions.

11. The method of claim 10, wherein sending the combined processing agent and transaction to a processing resource further comprises:
    determining characteristics of at least a plurality of processing resources in the set of processing resources; and
    sending the combined processing agent and transaction to a processing resource of the plurality of processing resources having a determined characteristic below a predetermined threshold level.

12. The method of claim 11, wherein sending further comprises sending the combined processing agent and transaction to a processing resource of the plurality of processing resources having a processing load below a predetermined threshold.

13. The method of claim 10, wherein the selected processing agent comprises machine readable instructions that describe or define a set of processing operations, and sending the combined processing agent and transaction comprises sending the combined processing agent and transaction via a network to the processing resource.

14. A non-transitory computer-readable medium having computer-readable instructions stored thereon that are executable by a processor to:

receive a transaction for processing;

determine characteristics of the transaction, wherein the characteristics comprises at least one transaction type and processing operation;

determine, based on the characteristics of the transaction, processing agents, wherein at least one of the processing agents is constructed by selecting and combining processing agent elements from a library of predetermined processing agent elements;

determine, based on the characteristics, a relevancy rating for each of the processing agents;

select a processing agent with a highest relevancy rating;

modify the selected processing agent if the relevancy rating of the selected processing agent is less than a predetermined level;

combine the selected processing agent and the transaction; and send the combined processing agent and transaction to a processing resource of a set of processing resources to cause the processing agent to process the transaction on at least one computing device of the processing resource, wherein the processing agent comprises machine readable instructions.

15. The non-transitory computer-readable medium of claim 14, wherein the selected processing agent comprises machine readable instructions that describe or define a set of processing operations.

16. The non-transitory computer-readable medium of claim 15, wherein to send the combined processing agent and transaction comprises sending the combined processing agent and transaction via a network to the processing resource.

* * * * *